3,231,712
CARBON STEEL OXY-INERT MONATOMIC GAS-SHIELDED METAL-ARC WELDING
Kenneth H. Koopman, Fanwood, N.J., assignor to Union Carbide Corporation, a corporation of New York
No Drawing. Filed June 16, 1953, Ser. No. 362,147
2 Claims. (Cl. 219—145)

This invention relates to gas-shielded metal-arc welding, and more particularly to arc welding carbon steel work under a stream of gas which is composed of a mixture of oxygen and inert monatomic gas or gases, such as argon and helium.

The patent application of R. T. Breymeier, filed February 10, 1951, Serial No. 210,397, for "Oxy-Argon Gas-Shielded Metal-Arc Welding," discloses that an arc shielding gas consisting of a mixture of 1%–20% oxygen and the balance argon provides marked improvements in sigma welding. In welding carbon steel according to such process with up to 10% oxy-argon gas shield, the arc is stable and a relatively flat weld-bead is produced. However, using commercially available welding rods such as Linde "Oxweld" No. 32CMS, "Oxweld" No. 1HT Modified and "Oxweld" No. 1HT Standard, the weld-metal was not always sound, i.e., some porosity was present which is undesirable.

In "open" arc welding it has been proposed to solve the problem of porosity in the resulting weld-metal by "tailoring" the composition of the rod to obtain the desired soundness. In general, however, such welding rods are not suitable for sigma welding all carbon steels, such as rimmed steels.

According to this invention consistently sound weld-metal is produced by the use of a multiple-residual-deoxidizer-containing steel (wire or rod) electrode in combination with an oxy-argon arc shielding gas in the metal-arc welding of carbon steel work. A mixture of 0.50% to 10% oxygen and the balance argon is preferred, although some helium may be added to the mixture. More than two residual deoxidizers in the steel electrode are much more effective in eliminating porosity in the weld-metal than one or two. Apparently an additional or reinforcing effect results, so that a relatively small percentage of three or more different residual deoxidizers, such as aluminum, zirconium, titanium and silicon, consistently produce sound welds with oxy-argon shielding gas in a wide variety of plain carbon and low carbon steels. Calcium and magnesium as well as chromium, vanadium and manganese are also beneficial.

Although a pecific choice of deoxidizer content in an electrode composition has been previously disclosed, it is to be noted that such a choice is in no wise to be confused with that of the present invention. In such disclosures, the choice of deoxidizer content was for the purpose of eliminating, in the weld deposit, the formation of undesirable inclusions that might result from reaction of the molten metal with one or more components of the gaseous medium (air) surrounding the arc, mainly nitrogen. In the present invention, the end is primarily to produce a sound weld of relatively low hardness and good ductility in oxy-inert-monatomic gas-shielded carbon steel metal-arc welding.

In the manufacture of steels of the rimming type, solidification in the mold is induced prior to the completion of the carbon-oxygen reaction. Such reaction may be represented by the equation

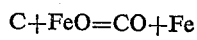

$$C + FeO = CO + Fe$$

As a result of the evolution of gas as indicated in the reaction, these steels are porous in the as-cast state, but are usually sound when hot-rolled or otherwise hot-worked, since the blowholes have been sealed during the hot-working operation. On the other hand, when such a steel is remelted the above reaction is resumed with consequent gas evolution. In welding this type of steel by the customary procedures, the evolved gas causes a porous condition to develop in the weld. Even low-carbon semi-killed steels welded by the common inert monatomic gas-shielded techniques will frequently exhibit this condition due to the high temperatures employed and the oxidizing action of the air which may have diffused through the inert gas shield in sufficient quantity to eliminate the deoxidizers as effective agents and thus renew the carbon-oxygen reaction.

A source of blowhole formation in welds made in commercial practice under inert monatomic gas shields, comprises the absorption of nitrogen from diffused air by the molten metal, which is rejected on solidification. Although, theoretically, a perfect shield should not permit this to occur, at the normal rates of flow employed in commercial practice, for example, 3 to 6 liters of gas per minute, there is sufficent diffusion of air to cause some porosity from this source. The presence, in the welding rods of the invention, of nitride-forming elements which stabilize any nitrogen entering the sphere of reaction by forming solid stable metallic nitrides, or of other elements that limit the liquid solubility or increase the solid solubility of nitrogen, effectively checks this type of porosity.

Satisfactory gas-shielded arc welds are quite commonly made with the currently available welding rods, but it has been found that such rods are relatively sensitive to poor shielding, that is, porosity is often encountered unless the rate of flow of inert gas is maintained at a relatively high rate, by reason of the reactions hereinbefore described.

Mere freedom from porosity does not necessarily result in a satisfactory weld. Unless the flowing characteristics of the weld metal, as well as the slag formed, meet certain requirements, the welding operation may be unduly prolonged or otherwise unsatisfactory welds result. For example, in a poorly flowing weld metal of unbalanced composition, the molten metal will appear to possess abnormal surface tension. The crown of the weld will be high rather than flat, and the tendency to undercutting will be pronounced. This comprises a depression along the sides of the weld. In addition, the mechanical properties of the weld deposit are significant factors in determining its acceptability.

The amount and type of slag formed during welding are often important, and with an unbalanced composition undesirable slag conditions might be encountered. Although at times not particularly deleterious, it might sometimes fail to float to the surface and become entrapped in the weld metal. Again it may be of a character such that it is not readily removable from the surface of the weld. This is particularly objectionable when no finishing operation such as grinding is intended.

The proper balancing of the deoxidizer content is thus an important factor. For example, the addition of aluminum to a rod deficient in silicon, although perhaps accomplishing the desired deoxidizing ends, will result in poor flowing characteristics in the weld puddle and an excessive amount of slag. Although the presence of 0.25% silicon permits the lowering of the aluminum content to that at which good flowing characteristics are obtained, the weld metal is still sensitive to weld conditions such as low gas flows and high currents. Increasing the silicon content to 0.50% eliminates such sensitivity. Again, although manganese possesses some tendency to reduce the sensitivity of the weld to porosity, it possesses the additional and more important virtue of improving the fluidity and flow characteristics. However, above about 2% manganese the weld puddle becomes too fluid for some applications, such as "position" welding vertical and overhead, and it is probable that excessive hardening of the weld metal will take place. It has also been discovered that the use of aluminum, zirconium, and titanium in combination is superior to any single one or pairs of these elements.

The following table sets forth three chemical compositions of electrode wires or rods that have been found to be suitable as "hot" or "cold" filler metal according to the invention with 1%, 2%, 2.5% and 5% oxy-argon shielding gas in arc welding carbon steel work.

| Composition | Rod A | Rod B | Rod C |
|---|---|---|---|
| Carbon | .028 | .04 | .08 |
| Manganese | .30 | .70 | 1.07 |
| Silicon | .05 | .45 | .47 |
| Sulphur | | .03 | .031 |
| Phosphorus | | .03 | .023 |
| Aluminum | .086 | .09 | .08 |
| Zirconium | | .04 | .04 |
| Titanium | | .07 | .07 |
| Chromium | | .20 | .51 |
| Iron | (1) | (1) | (1) |

[1] Balance.

In general the residual titanium content may range between 0.01% and 0.50%; the zirconium between 0.01% and 0.40%; the aluminum between 0.005%–0.50%; the phosphorus and sulphur are preferably as low as possible but in any case not more than 0.04% maximum; the silicon from 0.05% up to 1.00%; the manganese 0.05% up to 2.00%; and the carbon content as low as possible, preferably below 0.10% and in no case more than 0.20%. In the cases of chromium and vanadium the range may be 0.01%–1.50% for chromium, and 0.01%–0.30% for vanadium; and in the cases of calcium and magnesium the range may be 0.001% to 0.200% for each. Oxygen additions between 0.5% and 10% inclusive are beneficial depending upon the thickness, position, type of steel, welding speed, and welding current.

Successful peripheral welds were made according to the invention with the apparatus of my application Serial No. 211,653, filed February 19, 1951, for "Gas Shielded Metal Arc Welding Method," now Patent No. 2,681,970, on carbon steel artillery shells comprising cylinders about five inches in diameter, having a ⅜ inch wall thickness. The shielding gas was composed of a mixture of 2% commercially pure U.S.P. oxygen and the balance commercially pure argon, flowing at a rate of about 40 cubic feet per hour through the torch. Direct current-reverse polarity was employed to energize the arc, at a value of 380–420 amperes. The arc was about ¼ of an inch long. The lineal speed of welding was between 6–60 inches per minute, using a 3/32 of an inch diameter welding wire (electrode) and auxiliary wire (filler) both composed of low carbon steel containing manganese, silicon and aluminum which are strong deoxidizers. The auxiliary rod feed speeds ranged between 46–88 inches per minute, and the resulting welds were good. Slightly higher electrode wire feed speeds than normal were used due to the presence of oxygen in the shielding gas.

Good welds were also obtained in the same set-up under otherwise similar conditions with straight polarity-direct current having a value of about 450 amperes, at a lineal welding speed of 10 i.p.m., with an auxiliary rod feed speed of 52 i.p.m. In carrying out the invention with straight-polarity arc welding current the technique disclosed by Breymeier and Butler in their application Serial No. 248,362, filed September 26, 1951, is recommended. The invention is also suitable for A.C. oxy-argon gas-shielded arc welding with or without high-frequency stabilization.

Some of the advantages flowing from the present invention with the set-up of my application Serial No. 211,653 include the following: substantially increasing (doubling) the deposition rate, reducing undesirable undercutting, decreasing the consumption of shielding gas, decreasing weld spatter, reducing base metal penetration as desired, increasing stability, and reducing undesirable porosity.

The invention comprises impressing a potential to produce and maintain an arc sufficient to melt a consumable electrode between such electrode and the material to be welded such as low carbon steel. An arc is struck between the electrode and said material while such potential is impressed therebetween, while such arc is sheathed in an atmosphere of inert gas such as argon to which is added oxygen to an amount equivalent of up to 10% by volume, and adding strongly deoxidizing agents to the arc while it is burning. The deoxidizing agents may be combined with the electrode metal or with an auxiliary filler metal or divided between them as desired. I prefer to use at least three and preferably all of the following four residual alloy deoxidizers in carbon steel electrode and/or filler wire: silicon (0.05%–1.00%), titanium (0.01%–0.50%), zirconium (0.01%–0.40%) and aluminum (0.01%–0.50%). The resulting welds are sound and the operation is facilitated.

I claim:

1. A low carbon steel alloy electrode for oxy-argon gas-shielded metal-arc welding which consists of the following ingredients:

| Element— | Range, percent |
|---|---|
| Carbon | 0.028–0.10 |
| Manganese | 1.00–2.00 |
| Silicon | 0.45–1.00 |
| Aluminum | 0.005–0.09 |
| Zirconium | 0.01–0.04 |
| Titanium | 0.01–0.07 |
| Iron | Balance | said alloy also containing a minimum of impurities including sulphur and phosphorus the percentages of which are as small as possible, and in any case no more than a maximum of 0.04% each; in which alloy electrode all four of the ingredients consisting of the silicon, aluminum, zirconium and titanium act as residual deoxidizers in concert with the manganese to greatly improve welding with such electrode in an oxy-argon gas shield.

2. Method of arc welding which comprises energizing a welding arc between a metal alloy electrode as defined by claim 1, and work composed of carbon steel, while shielding such arc and the adjacent parts of the electrode and work with a stream of argon containing 2% to 10% oxygen.

References Cited by the Examiner

UNITED STATES PATENTS

| | | | |
|---|---|---|---|
| 1,352,534 | 9/1920 | Russell | 219—145 |
| 1,354,266 | 9/1920 | Plant | 219—74 |
| 1,954,296 | 4/1934 | Keir | 219—145 |
| 2,053,417 | 9/1936 | Brace | 219—72 |
| 2,140,237 | 12/1938 | Leitner | 219—145 |
| 2,360,160 | 10/1944 | Pickhauer | 219—130 |
| 2,424,201 | 7/1947 | Van Nuys | 62—175.5 |
| 2,497,589 | 2/1950 | Dennis | 62—175.5 |
| 2,504,868 | 4/1950 | Muller et al. | 219—130 |
| 2,544,711 | 3/1951 | Mikhalapov | 219—75 |
| 2,559,132 | 7/1951 | Roberts | 62—175.5 |
| 2,644,070 | 6/1953 | Herbst | 219—137 |
| 2,658,162 | 11/1953 | Tichenor et al. | 314—36 |
| 2,681,970 | 6/1954 | Koopman | 219—137 |
| 3,143,631 | 8/1964 | Sohn et al. | 219—74 |

FOREIGN PATENTS 736,049 8/1955 Great Britain.

OTHER REFERENCES

"Welding Journal," October 1938, page 64 of Supplement.

"Welding Journal," March 1940, page 111 of Supplement.

RICHARD M. WOOD, *Primary Examiner.*

MAX L. LEVY, *Examiner.*